United States Patent [19]

Sterling

[11] Patent Number: 5,530,900
[45] Date of Patent: Jun. 25, 1996

[54] DISPLAY SYSTEM FOR SELECTIVELY DISPLAYING DIFFERENT TYPES OF INFORMATION DEPENDING UPON THE DETECTION OF NON-STANDARD SWITCH SELECTIONS

[75] Inventor: Jeffrey A. Sterling, Lombard, Ill.

[73] Assignee: Zenith Electronics Corporation, Glenview, Ill.

[21] Appl. No.: 230,284

[22] Filed: Apr. 20, 1994

[51] Int. Cl.⁶ ................................................ G06F 15/00
[52] U.S. Cl. .................... 395/838; 395/161; 395/155; 364/927.2; 364/926.92
[58] Field of Search .................. 395/275, 838, 395/161, 155; 370/94; 379/58; 340/792; 364/709, 424; 250/372

[56] References Cited

U.S. PATENT DOCUMENTS

| | | | |
|---|---|---|---|
| 4,609,919 | 9/1986 | Miyazaki et al. | 340/792 |
| 4,713,808 | 12/1987 | Gaskill et al. | 370/94 |
| 4,985,632 | 1/1991 | Bianco et al. | 250/372 |
| 5,124,940 | 6/1992 | Lapeyre | 364/709 |
| 5,241,583 | 8/1993 | Martensson | 379/58 |
| 5,416,705 | 5/1995 | Barnett | 364/424 |

OTHER PUBLICATIONS

"Operating Guide and Warranty" Booklet for Zenith Digital System 3 Color Projection TV ©1990, Part No. 206–1991, pp. covers, 2–1, 2–2, 3–1.

Primary Examiner—Thomas C. Lee
Assistant Examiner—Greta L. Robinson
Attorney, Agent, or Firm—Roland W. Norris

[57] ABSTRACT

An electronic device feature display system for displaying information concerning the features inherent in a consumer electronics product having a limited number of alpha-numeric generating display segments thereon helps distinguish the product from its competitors while on the display shelf. One suitable use is for the fluorescent display panel of a video cassette recorder which may utilize a letter scrolling mode to form a continuous display of product features. Routines to make the feature banner practical on the sales floor are also discussed.

5 Claims, 2 Drawing Sheets

| O | N | E | | Y | E | A | R | / | 8 | | Fig. 4 |

| / | 8 | | E | V | E | N | T | | T | I | Fig. 5 |

| T | I | M | E | R | • | • | • | 4 | | V | Fig. 6 |

| 4 | | V | I | D | E | O | | H | E | A | Fig. 7 |

| M | T | S | | S | T | E | R | E | O | | Fig. 8 |

| | | D | E | C | O | D | I | N | G | | Fig. 9 |

DISPLAY SYSTEM FOR SELECTIVELY DISPLAYING DIFFERENT TYPES OF INFORMATION DEPENDING UPON THE DETECTION OF NON-STANDARD SWITCH SELECTIONS

BACKGROUND OF THE INVENTION

1. Field of the Invention

The present invention relates to means and/or method for displaying the features of a consumer electronics product. The present invention specifically relates to displaying the features of a consumer electronics product which has limited alpha-numeric display capability.

2. Discussion of the Related Art

On the display floor of a typical consumer electronics retailer there are usually many models of a particular type of product aligned together, such as televisions, VCRs, stereo, amplifiers, etc. In the case of televisions or computer monitors the consumer can make a direct comparison of picture quality or for stereo components comparison of audio quality is often possible. Often, however, direct comparison is impractical and/or expensive for the retailer and products are merely displayed more or less unattended. In this instance there maybe little to differentiate these products beyond the visual appearance of the outer casing of the product.

Especially in mass marketing or so called "warehouse" locations, product differentiation is left to "feature banners" which are labels applied to the products or their boxes to detail the inherent features of the products. Televisions or computer monitors having essentially unlimited text and pictorial display capability may be easily arranged to provide self-demonstration of their inherent features in an unattended sales environment. However, VCRs or other small electronic devices generally not hooked up to an output device may have little in the way of appearance differentiation, and are further constrained from self-demonstration by having a limited means for displaying information such as an alpha-numeric display of less than twelve segments. Thus, product differentiation means for the display models are doubly important yet very constricted by the capabilities of the consumer electronics device.

Thus, it would be desirable to provide a means for displaying the features of such a consumer electronics unit while on display on the sales floor in order to differentiate the product from the surrounding competitive units.

OBJECT OF THE INVENTION

It is, therefore, an object of the invention to provide an onboard electronic feature display contained within a consumer electronics product having a limited capability display device in order to serve as an unattended sales tool to differentiate the product from its competition.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

FIGS. 4–9 illustrate utilization of the fluorescent display panel of the consumer electronics product according to the present invention.

DESCRIPTION OF THE PREFERRED EMBODIMENT

Figure 1:
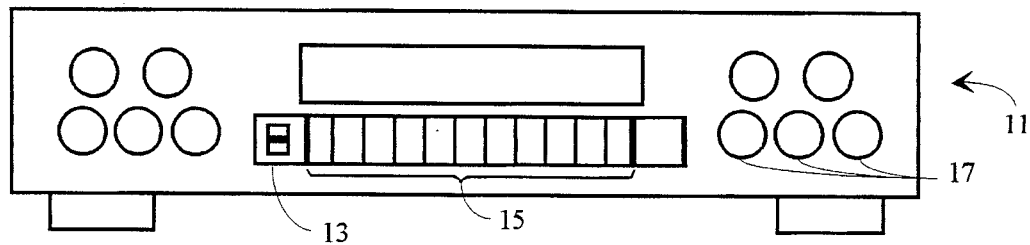
FIG. 1 is a front elevation of a VCR according to the present invention.

As seen in FIG. 1, a consumer electronics device having limited alpha-numeric display capability, such as a VCR 11 contains a fluorescent display panel 13 or FDP having an eleven segment alpha-numeric display 15 which would normally display text indicating the operational status of the VCR, e.g., fast forward, rewind, play, time and date, etc. For example, such an eleven segment display type number 11-BT-89GK or its equivalent is available from Futaba Corporation of Japan. The VCR further has switches 17 constituting the operator interface for operator selection of the VCR functions. It will be appreciated that such switches may also be part of the VCR through its remote control unit (not shown).

Figure 2:
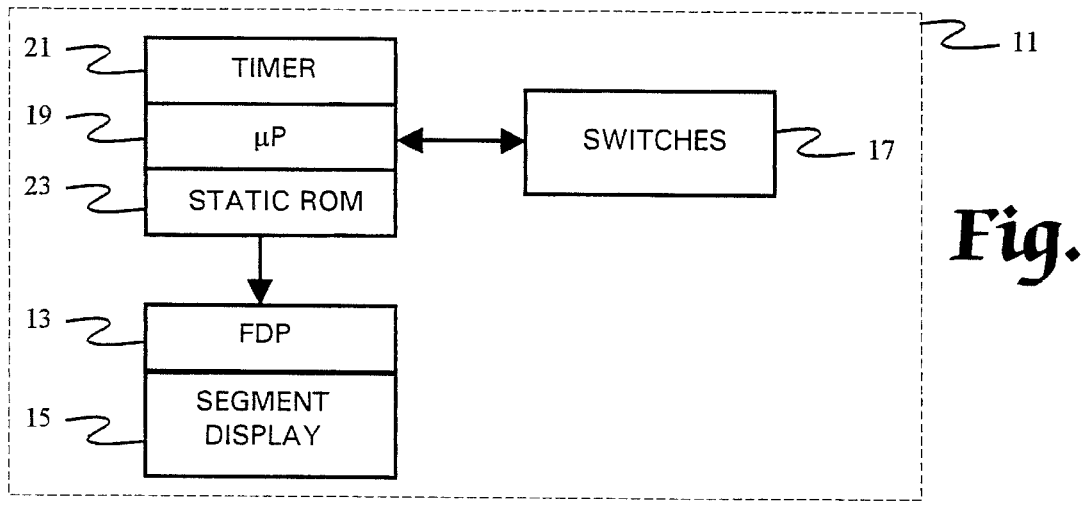
FIG. 2 is a block diagram of the principle operational components of the feature display means according to the present invention.

As seen schematically in FIG. 2, within the VCR, or other consumer electronics device 11, is a microprocessor 19 which preferably, but not necessarily, has integrated therein a timer 21 and a static ROM memory 23. The microprocessor 19 of the preferred embodiment is available from Mitsubishi Electronics of Japan as chip number M38184MA. As can be seen, the microprocessor 19 is in electrical connection with switches 17 and the fluorescent display panel 13. The static ROM memory 23 contains the display panel control program and includes an operator interface recognition subroutine and a character generation sequence subroutine for affecting the feature display, as further explained below.

Figure 3:
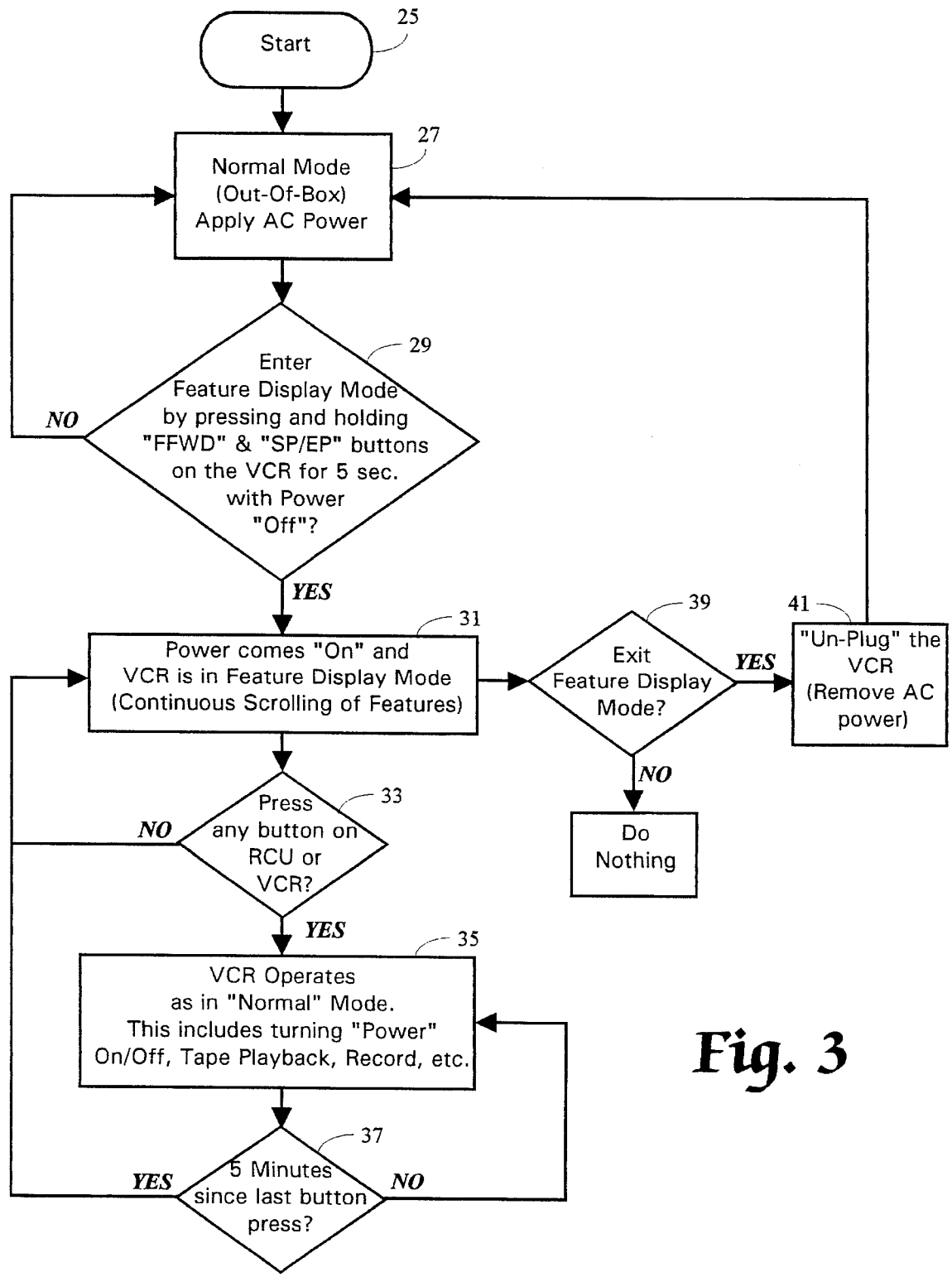
FIG. 3 is a flow chart for the operation of the feature display means of the present invention.

As seen in FIG. 3, an operational flow chart for the feature display means and the display panel control program, the electronics retailer will receive the VCR from the manufacturer at the start point, ref. no. 25. The next step is to remove the VCR from its shipping material as at ref. no. 27 and apply AC power while placing the VCR on the display or retail floor. Once AC power is applied, the operator interface recognition subroutine is activated. In order to enter the feature display mode the sales person will press and hold a nonstandard or unusual switch combination, such as the fast forward and SP/EP buttons on the VCR for five seconds with the power selection switch off, as at ref. no. 29. As will be understood by the artisan, the microprocessor 19 with its timer function 21 controls the operator interface recognition subroutine and will be timing the length of time that the switches 17 are depressed or closed. It will further be appreciated that other non-standard button combinations or switch closing times may be used. It is recommended that the feature display mode be entered into through a non-standard combination of switch selections so that the display mode will not be accidentally activated by the consumer/end user in his home. Further, by having the display mode feature activated while the power selection switch is "off", activation of the display mode by the end user is made further more unlikely. As seen at ref. no. 31, the VCR will then turn its power switch "on" and enter the feature display mode.

At this point the microprocessor will begin loading the character generation sequence subroutine from static ROM 23 in order to operate the eleven segment display 15 of the FDP 13 which, in the preferred mode is a continuous scrolling display of features such as "ENGLISH/SPANISH LANGUAGE", "1 YEAR/8 EVENT TIMER", "4 VIDEO HEADS", "STEREO MTS DECODING", etc. inherent in the VCR or other electronic device. Such a scrolling is illustrated in FIGS. 4–7 which illustrate a sequence of scrolling to display the "1 YEAR/8 EVENT TIMER" and "4 VIDEO HEADS" messages as shown in time sequence from FIGS. 4–7. Alternatively, as seen in FIGS. 8 and 9, the messages may be displayed sequentially rather than scrolled.

An interrupt subroutine is possible to take the VCR temporarily out of feature display mode as at ref. no. 33 by pressing any button on the remote control unit (RCU) or the face of the VCR. Once any switch is depressed, the VCR will operate as if it is in its normal mode, as at box ref. no. 35, in order to allow the consumer or sales person to demonstrate/investigate the features of the VCR. However, the display mode program for scrolling the features across the eleven segment display has only been interrupted. The timer 21 runs and is reset with each button push. After five minutes from the last switch selection the microprocessor 19 will cancel the interrupt subroutine and start with the character generation sequence subroutine to again start scrolling the inherent features of the VCR across the FDP as at ref. no. 37. Thus, no sales personnel has to reactivate the unit into feature display mode by redoing the unique switch selection for a given time as shown at ref. no. 29.

If one wishes to exit the feature banner mode as at ref. no. 39, one must remove the AC power from the VCR as at ref. no. 41 by unplugging the VCR or removing power from the plug strip. Thus, a VCR sold from the display rack will have the feature display mode canceled and be ready to operate in normal mode for the end user.

While the present invention has been illustrated and described in connection with the preferred embodiments, it is not to be limited to the particular structure shown, because many variations thereof will be evident to one skilled in the art and are intended to be encompassed in the present invention as set forth in the following claims.

What is claimed is:

1. In an electronic device having a microprocessor for controlling the function of the device, a static memory for containing operational routines to be run by the microprocessor, a timer to provide timing signals to the microprocessor, an operator interface having switches for operator selection of the device functions, and an alpha-numeric display with a limited number of character generating segments thereon for generating a variety of textual messages, the improvement comprising:

the static memory having a display panel control program contained therein with:
an operator interface recognition subroutine for recognizing a predetermined sequence of non-standard operator interface switch selection for a predetermined amount of time; and
a character generation sequence subroutine for generating a display of features inherent in the electronic device, the operator interface recognition subroutine passing control to the character generation sequence subroutine when activated, thereby causing the character generation sequence subroutine to control the alpha-numeric display panel to generate a display of the inherent features on the display panel;

wherein the character generation sequence subroutine further contains an interrupt subroutine allowing the device to temporarily exit the feature display mode and assume normal operation upon the selection of a switch by an operator, the interrupt subroutine having a time limit thereon, such that the interrupt subroutine is canceled and returns to the feature display mode at a predetermined amount of time after a last switch selection by the operator.

2. The electronic device of claim 1 wherein the display of inherent features is scrolled across the alpha-numeric display.

3. The device of claim 1 wherein the display of features is composed of words or abbreviations each having a number of alpha-numeric characters equal to or less than the total number of segment, said words or abbreviations being displayed sequentially on the alpha-numeric display.

4. The device of claim 1 wherein the display panel control program is canceled by removing AC power from the electronic device.

5. The device of claim 1 wherein the feature character generation subroutine is activatable only when a power select switch of the device is in the off position.

\* \* \* \* \*